United States Patent
Kawamoto et al.

(10) Patent No.: US 9,945,478 B2
(45) Date of Patent: Apr. 17, 2018

(54) CONTROL DEVICE FOR CONTINUOUSLY VARIABLE TRANSMISSION

(71) Applicant: JATCO Ltd, Fuji-shi, Shizuoka (JP)

(72) Inventors: Yoshinobu Kawamoto, Atsugi (JP); Tomohiro Utagawa, Sagamihara (JP); Takashi Eguchi, Machida (JP)

(73) Assignee: JATCO Ltd, Fuji-Shi (JP)

( * ) Notice: Subject to any disclaimer, the term of this patent is extended or adjusted under 35 U.S.C. 154(b) by 23 days.

(21) Appl. No.: 15/036,140

(22) PCT Filed: Dec. 10, 2014

(86) PCT No.: PCT/JP2014/082641
§ 371 (c)(1),
(2) Date: May 12, 2016

(87) PCT Pub. No.: WO2015/087900
PCT Pub. Date: Jun. 18, 2015

(65) Prior Publication Data
US 2016/0290503 A1    Oct. 6, 2016

(30) Foreign Application Priority Data
Dec. 11, 2013  (JP) .................... 2013-256399

(51) Int. Cl.
*B60W 10/06* (2006.01)
*B60W 10/107* (2012.01)
(Continued)

(52) U.S. Cl.
CPC ....... *F16H 61/66272* (2013.01); *B60W 10/06* (2013.01); *B60W 10/107* (2013.01);
(Continued)

(58) Field of Classification Search
CPC .... B60W 10/06; B60W 10/107; B60W 10/11; B60W 30/18018
See application file for complete search history.

(56) References Cited

U.S. PATENT DOCUMENTS 6,344,014 B1 *  2/2002  Eguchi .................. B60K 6/485
                                                                  477/39
6,776,739 B2 *  8/2004  Eguchi .................. B60K 6/485
                                                                  477/107
(Continued)

FOREIGN PATENT DOCUMENTS

| JP | 2011-214699 A | 10/2011 |
| JP | 2012-07784 A | 4/2012 |
| JP | 2013-204722 A | 10/2013 |

*Primary Examiner* — Ramya P Burgess
*Assistant Examiner* — David R Morris
(74) *Attorney, Agent, or Firm* — Foley & Lardner LLP

(57) ABSTRACT

A control apparatus for a continuously variable transmission with a sub transmission includes a primary solenoid valve installed at an oil passage in a midway position between a mechanical oil pump and a primary pulley and configured to control a hydraulic pressure to be supplied to the primary pulley. The control apparatus further includes a transmission controller which outputs a primary current command value to a primary solenoid valve. The transmission controller outputs the primary current command value which previously closed the oil passage between the mechanical oil pump and the primary pulley to the primary solenoid valve before a rise in an engine revolution number due to at least a re-start of the engine, when a coast stop control/an idle stop control is carried out.

4 Claims, 8 Drawing Sheets

(51) Int. Cl.
   *F16H 61/66* (2006.01)
   *F16H 61/662* (2006.01)
   *B60W 10/11* (2012.01)
   *F16H 61/00* (2006.01)
   *F16H 61/70* (2006.01)
   *B60W 30/18* (2012.01)

(52) U.S. Cl.
   CPC ......... *B60W 10/11* (2013.01); *F16H 61/0021* (2013.01); *F16H 61/70* (2013.01); *B60W 30/18018* (2013.01); *F16H 2312/14* (2013.01)

(56) References Cited

U.S. PATENT DOCUMENTS

| | | | |
|---|---|---|---|
| 7,815,545 B2 * | 10/2010 | Nakashima | B60W 10/02 477/138 |
| 9,022,901 B2 | 5/2015 | Watanabe et al. | |
| 2010/0125018 A1 | 5/2010 | Shin | |
| 2012/0067685 A1 | 3/2012 | Ohashi et al. | |
| 2012/0083388 A1 | 4/2012 | Watanabe et al. | |
| 2013/0260960 A1 | 10/2013 | Aoyama et al. | |

* cited by examiner

CONTROL DEVICE FOR CONTINUOUSLY VARIABLE TRANSMISSION

TECHNICAL FIELD

The present invention relates to a control apparatus for a continuously variable transmission applicable to a vehicle in which an engine stop control (a coast stop control and/or an idle stop control) is carried out.

BACKGROUND ART

Conventionally, an apparatus in which, when an engine revolution number (an engine speed) is reduced due to a start of the coast stop control and a drain pressure from an engine driven mechanical oil pump is reduced, an electrically driven oil pump is driven and a hydraulic pressure to pulleys and clutches is secured has been disclosed (for example, refer to a Patent Document 1).

This Patent Document 1 discloses that, in the continuously variable transmission with a sub transmission, during the coast stop control in which a driving force source is stopped in a traveling state of the vehicle, a speed ratio (a transmission gear ratio) of the continuously variable transmission is prevented from being upshifted toward a higher side than the speed ratio when the coast stop control is started. In this Patent Document 1, while a drive start of the electrically driven oil pump, the hydraulic pressure of a primary pulley is made approximate zero so that a lowest speed ratio is achieved in a balance pressure control and, thereafter, the coast stop control is ended.

However, in the conventional apparatus, when the electrically driven oil pump is abolished, the hydraulic pressure is not generated during the coast stop control. In a state in which the hydraulic pressure cannot be supplied to a secondary pulley, the lowest speed ratio is maintained (inhibit of a high shift). Because of this, there is a case where, even if a hydraulic pressure command value of the primary pulley is made zero, when the hydraulic pressure is supplied from the oil pump in response to a re-start of the engine at a time of a vehicular start, an actual pressure does not become zero dependent upon a situation of valves or so forth, the hydraulic pressure is supplied to the primary pulley, and the lowest speed ratio cannot be maintained.

In this way, when going through the coast stop control (when the vehicle is started), the hydraulic pressure is supplied to the primary pulley. At this time, the speed ratio is shifted toward the high speed ratio side without balancing at the lowest speed ratio. Thus, such a problem is raised that, due to a fact that the hydraulic pressure required for the vehicular start is used for the high shift, an engagement of a starting clutch is delayed, a reduction of the driving force due to the high shift is generated, and a vehicular starting performance is reduced.

PRE-PUBLISHED DOCUMENT

Patent Document

Patent document 1: A Japanese Patent Application First Publication (Tokkai) No. 2012-77840.

DISCLOSURE OF THE INVENTION

With the above-described problem in mind, it is an object of the present invention to provide a control apparatus for a continuously variable transmission which is capable of suppressing a reduction of a starting performance when a vehicle is started going through the engine stop control.

In order to achieve the above-described object, the control apparatus for the continuously variable transmission according to the present invention includes: an engine; a continuously variable transmission mechanism; a starting clutch; a mechanical oil pump; and engine stop control means.

In the control apparatus for the continuously variable transmission, a primary solenoid valve installed in a midway position of an oil passage from the mechanical oil pump to the primary pulley and configured to control the hydraulic pressure to the primary pulley and transmission control means for outputting a primary current command value to the primary solenoid valve are provided.

The transmission control means outputs the primary current command value which previously closes an oil passage from the mechanical oil pump to the primary pulley at least before an engine revolution number (engine speed) is raised due to a re-start of the engine, when the engine stop control is carried out.

Thus, when the engine stop control is carried out, at least before the engine revolution number (the engine speed) is raised due to the re-start of the engine, the primary current command value which previously closes the oil passage from the mechanical oil pump to the primary pulley is outputted to the primary solenoid valve. Hence, when the engine revolution number (engine speed) is gradually raised due to the re-start of the engine, before the engine revolution number is raised, the oil passage from the mechanical oil pump to the primary pulley is previously closed so that an oil supply to a primary hydraulic pressure chamber is stopped.

Since the oil supply to the primary hydraulic pressure chamber is stopped, an oil flow quantity from the mechanical oil pump can be used at the starting clutch side so that a time it requires until the starting clutch is engaged is shortened. In addition, since the oil supply to the primary hydraulic pressure is stopped, the continuously variable transmission mechanism is held at the lowest speed ratio and the reduction of the driving force at a time of the vehicular start is not generated. Consequently, during the vehicular start going through the engine stop control, the reduction of the starting performance can be suppressed.

EMBODIMENTS FOR CARRYING OUT THE INVENTION

Figure 1:
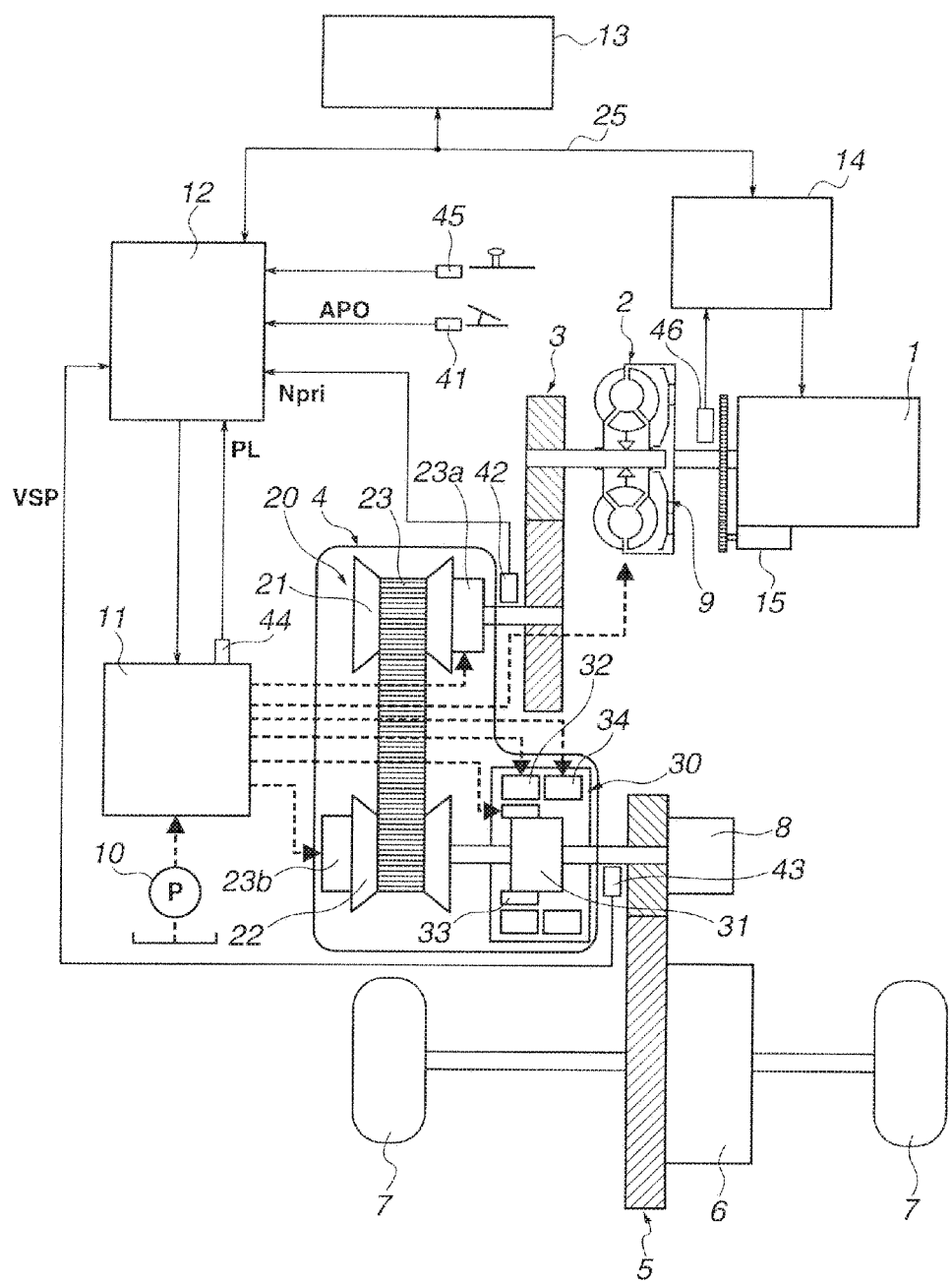
FIG. 1 is a whole system configuration view representing a rough structure of a vehicle in which a continuously variable transmission with a sub transmission (an example of the continuous variable transmission) to which a control apparatus in a preferred embodiment 1 has been applied.

Hereinafter, a best preferred embodiment which realizes a control apparatus for a continuously variable transmission according to the present invention will be explained on a basis of an embodiment 1 shown in the drawings.

Embodiment 1

First, a structure will be explained.

A control apparatus for a continuously variable transmission with a sub transmission (an example of the continuously variable transmission) in an embodiment 1 will be explained, dividing a structure thereof into [a whole system configuration], [a structure of a gearshift control using a gearshift map], [a structure of a coast stop control], and [a structure of a coast stop corresponding transmission control].

[A Whole System Configuration]

FIG. 1 shows a rough structure of a vehicle in which the continuously variable transmission with a sub transmission to which the control apparatus in embodiment 1 is applied is mounted. Hereinafter, a whole system configuration will be explained on a basis of FIGS. 1 and 2.

It should be noted that a speed ratio of a certain transmission mechanism is a value of an input revolution speed of the transmission mechanism divided by an output revolution speed of the transmission mechanism. It should also be noted that a lowest speed ratio means a maximum gearshift (speed) ratio of the transmission mechanism and a highest speed ratio means a minimum gearshift (speed) ratio of the transmission mechanism.

In a vehicle in which the continuously variable transmission with the sub transmission is mounted, an engine 1 having a starter motor 15 for starting engine 1 is installed. An output revolution of engine 1 is transferred to a torque converter 2 having a lock-up clutch 9, a reduction gear pair 3, a continuously variable transmission (hereinafter, referred simply as to "a transmission 4"), a final gear pair 5, and driving wheels 7 via a final speed reduction unit 6. A parking mechanism 8 which locks an output shaft of the transmission in a state incapable of rotation mechanically during a parking of the vehicle. In addition, the vehicle includes: a mechanical oil pump 10 driven by means of a motive power of engine 1; a hydraulic pressure control circuit 11 by pressure regulating a drain pressure from mechanical oil pump 10 to supply the regulated drain pressure to each part of transmission 4; a transmission controller 12 which controls hydraulic pressure control circuit 11; an integrated controller 13; and an engine controller 14. Hereinafter, each structure of these components will be explained.

Transmission 4 includes: a belt type continuously variable transmission mechanism (hereinafter, called "a variator 20"); and a sub transmission mechanism 30 installed in series with variator 20. It should herein be noted that "installed in series" means that variator 20 and sub transmission mechanism 30 are installed in series in a power transmission path.

Sub transmission mechanism 30 may directly be to be connected to an output shaft of variator 20, as in this embodiment, or may be connected via another gearshift (transmission) or power transmission mechanism (for example, a gear train).

Variator 20 is the belt type continuously variable transmission having a primary pulley 21, a secondary pulley 22, and a V-belt 23 wrapped between pulleys 21, 22. Each of pulleys 21, 22 includes: a fixed conical plate; a movable conical plate arranged with a sheave surface faced toward the fixed conical plate and forming a V-groove between the fixed conical plate and the movable conical plate; and a primary hydraulic pressure chamber 23a and a secondary hydraulic pressure chamber 23b provided on a back surface of the movable conical plate for displacing the movable conical plate in an axial direction. When the hydraulic pressures supplied to primary hydraulic pressure chamber 23a and secondary hydraulic pressure chamber 23b are adjusted, widths of the V-groove change to change contact radii of V-belt 23 and respective pulleys 21, 22 so that a speed ratio vRatio of variator 20 continuously changes.

Sub transmission mechanism 30 is a transmission mechanism with two forward speeds and one reverse speed. Sub transmission mechanism 30 includes a Ravigneaux-type planetary gear mechanism 31 in which carriers of two planetary gears are coupled, and a plurality of frictional engagement elements (a low brake 32, a high clutch 33, and a reverse brake 34) which are connected to a plurality of rotation elements constituting the Ravigneaux-type planetary gear mechanism 31 to change coupled states of these rotation elements. If hydraulic pressures supplied to the respective frictional engagements 32 through 34 are adjusted to change engaged and released states of respective frictional engagements 32 through 34 are adjusted to change engaged and released states of the respective frictional engagement elements 32 through 34, a gear position of the sub-transmission mechanism 30 is changed.

For example, sub transmission mechanism 30 is set to a first gear position if low brake 32 is engaged and high clutch 33 and reverse brake 34 are released. Sub transmission mechanism 30 is set to a second gear position with a gear ratio lower (smaller) than in the first gear position, if high clutch 33 is engaged and high clutch 33 and reverse brake 34 are released. Sub transmission mechanism 30 is set to a reverse gear position if reverse brake 34 is engaged and low brake 32 and high clutch 33 are released.

In the following description, a case where sub transmission mechanism 30 is in the first gear position is expressed by that "transmission 4 is in a low-speed mode" and a case where sub transmission mechanism 30 is in the second gear position is expressed by that transmission 4 is expressed by that "transmission 4 is in a high-speed mode".

Figure 2:
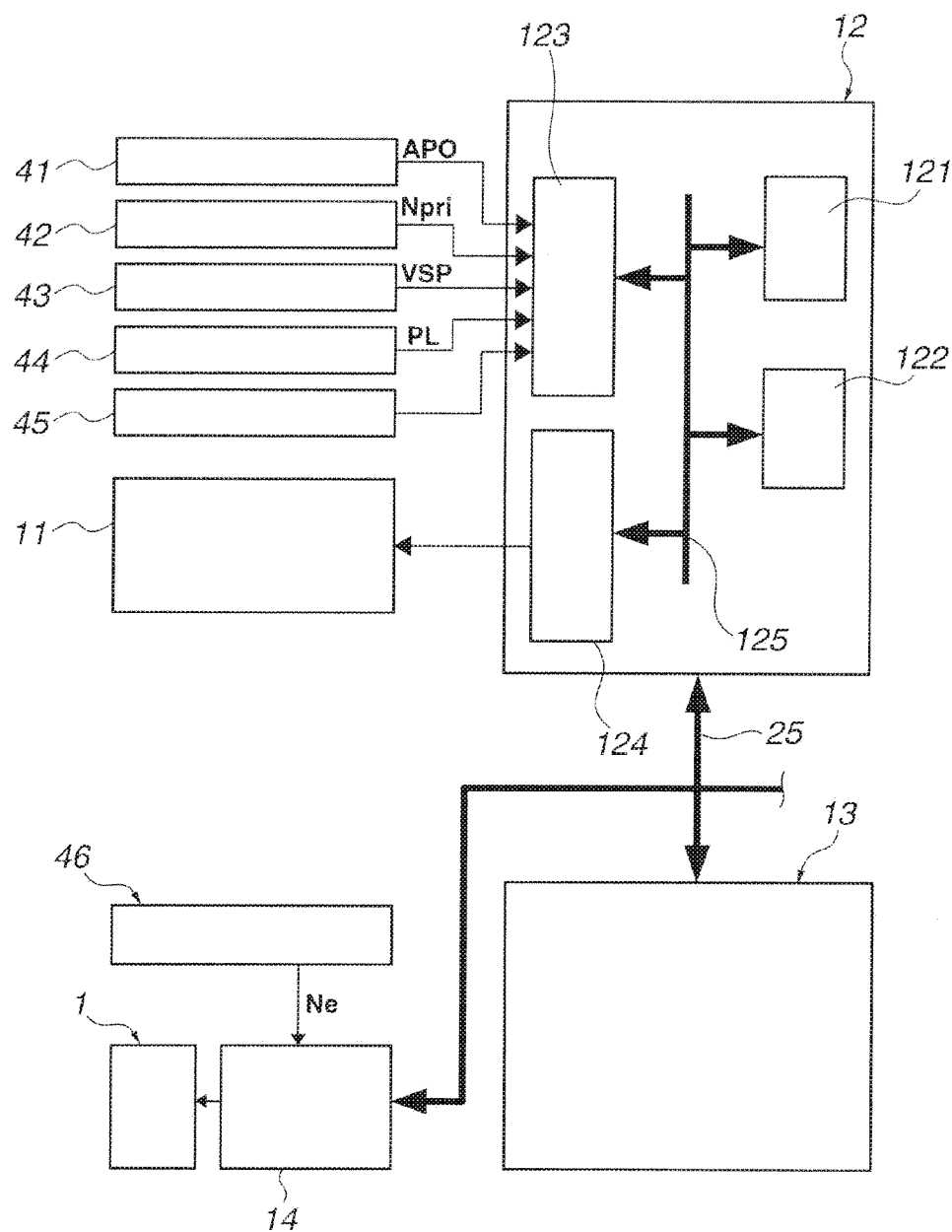
FIG. 2 is a control block diagram representing a control system structure with a transmission controller in embodiment 1 as a center.

Transmission controller 12, as shown in FIG. 2, includes: a CPU 121, a memory unit 122 constituted by a RAM and a ROM; an input interface 123; an output interface 124; and a bus 125 which connects these components to each other.

An output signal of an accelerator (pedal) opening angle sensor 41 which detects a depression opening angle of an accelerator pedal (hereinafter referred to as "an accelerator opening angle APO"), an output signal of a revolution number (speed) sensor 42 which detects an input revolution speed of transmission 4 (=a revolution speed of primary pulley 21, hereinafter, referred to as a "primary revolution number" Npri), an output signal of a vehicle speed sensor 43 which detects a traveling speed of the vehicle (hereinafter, referred to as a "vehicle speed VSP"), an output signal of a line pressure sensor 44 which detects a line pressure of transmission 4 (hereinafter, referred to as a "line pressure PL"), an output signal of an inhibitor switch 45 which detects a position of a select lever, and so forth are inputted to input interface 123.

Memory unit 122 stores a gearshift (transmission) control program of transmission 4 and a gearshift map (FIG. 3) used in this gearshift (transmission) control program.

CPU 121 reads and executes the gearshift control program stored in memory unit 122, performs various computations on various signals inputted via input interface 123 to generate a gearshift (transmission) control signal, and outputs the generated gearshift control signal to hydraulic pressure control circuit 11 via output interface 124. Various values used in the calculations by CPU 121 and calculation results are appropriately stored in memory unit 122.

Hydraulic pressure control circuit 11 includes a plurality of flow paths (passages) and a plurality of hydraulic pressure control valves. Hydraulic pressure control circuit 11 controls the plurality of hydraulic pressure control valves to switch supply paths (passages) of the hydraulic pressures on a basis of the gearshift control signal from transmission controller 12. In other words, line pressure PL is pressure regulated from the drain pressure generated by mechanical oil pump 10 and regulated pulley pressure and clutch pressure are supplied to the respective components of transmission 4 with line pressure PL as a source pressure. Thus, speed ratio vRatio of variator 20 and the gear position of sub transmission mechanism 30 are changed so that a gearshift of transmission 4 is carried out.

Integrated controller 13 performs an integrated control over a plurality of vehicle mounted controllers so that the transmission control by means of transmission controller 12, the engine control by means of engine controller 14, and so forth are appropriately secured. This integrated controller 13 is connected to the vehicle mounted controllers such as transmission controller 12, engine controller 14, and so forth via a CAN communication line 25 so that an information exchange is possible.

Engine controller 14 performs a coast stop control in which engine 1 is stopped from a time at which a coast deceleration is carried out, an idle stop control in which engine 1 is stopped during a vehicle stop, an engine start control using starter motor 15, and so forth are carried out. An output signal of an engine speed (revolution number) sensor 46 which detects a revolution number (engine speed) of engine 1 (hereinafter, referred to as an "engine revolution number Ne") and so forth are inputted to engine controller 14.

[A Structure of a Gearshift Control Using a Gearshift Map]

Figure 3:
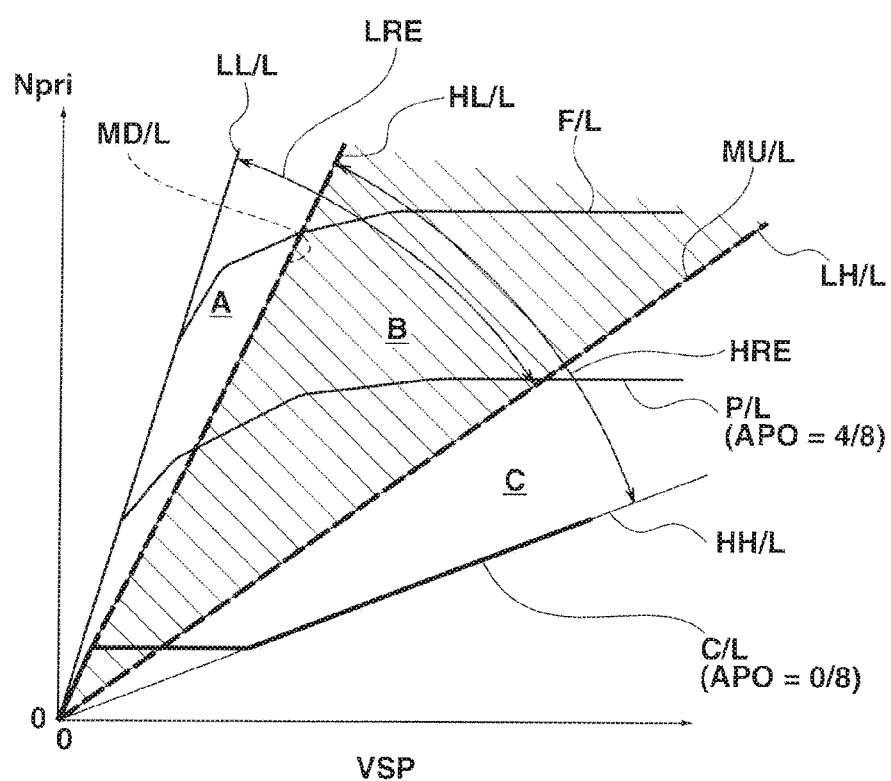
FIG. 3 is a gearshift map view representing one example of a gearshift map stored in a memory unit of the transmission controller in embodiment 1.

FIG. 3 shows an example of a gearshift map stored in memory unit 122 of transmission controller 12. Hereinafter, on a basis of FIG. 3, a structure of the gearshift control using the gearshift map will be explained.

An operating point of transmission 4 is determined on a basis of vehicle speed VSP and primary revolution speed Npri on the gearshift map shown in FIG. 3. An inclination of a line connecting the operating point of transmission 4 and a zero point at a lower left corner of the gearshift map corresponds to the speed ratio of transmission 4 (an overall speed ratio obtained by multiplying speed ratio vRatio of variator 20 by a speed ratio subRatio of sub transmission mechanism 30, hereinafter, referred to as a "through speed ratio") this gearshift map, a gearshift line is set for each accelerator pedal opening APO in a same way as the gearshift map of a conventional V-belt continuously variable transmission, and transmission 4 is shifted in accordance with the gearshift line selected according to accelerator pedal opening APO.

It should be noted that, for simplicity, only a full load line F/L (a gearshift line when the accelerator pedal opening APO=8/8), a partial load line P/L (a gearshift line when the accelerator pedal opening APO=4/8) and a coast line C/L (a gearshift line when the accelerator pedal opening APO=0/8) are shown in FIG. 3.

When transmission 4 is in the low-speed mode, transmission 4 can be shifted between a low-speed mode lowest line LL/L obtained by setting speed ratio vRatio of variator 20 to the lowest speed ratio (a maximum speed ratio) and a low-speed mode highest line LH/L obtained by setting the speed ratio vRatio of variator 20 to the highest speed ratio (a minimum speed ratio). In this case, the operating point of transmission 4 moves in areas A and B. On the other hand, when transmission 4 is in the high-speed mode, transmission 4 can be shifted between a high-seed mode lowest line HL/L obtained by setting the speed ratio vRatio of variator 20 to the lowest speed ratio (maximum speed ratio) and a high-speed mode highest line HH/L obtained by setting the speed ratio of variator 20 to the highest speed ratio (minimum speed ratio). In this case, the operating point of transmission 4 moves in areas B and C.

The speed ratio of each gear position of sub transmission mechanism 30 is so set that the speed ratio corresponding to low-speed mode highest line LH/L (a low-speed mode highest speed ratio) is lower (smaller) than the speed ratio corresponding to the high-speed mode lowest line HL/L (a high-speed mode lowest speed ratio). By this, a range of through speed ratio Ratio of transmission 4 that can be set in the low-speed mode ("low-speed mode ratio range LRE" in FIG. 3) and a range of through speed ratio Ratio of transmission 4 that can be set in the high-speed mode ("high-speed mode ratio range HRE" in FIG. 3) partly overlap, and transmission 4 can be selectively set in either one of the low-speed mode and the high-speed mode if the operating point of transmission 4 is in B area (an overlap area) defined between high speed mode lowest line HL/L and low-speed mode highest line LH/L.

Transmission controller 12, referring to this gearshift map, sets through speed ratio Ratio corresponding to vehicle speed VSP and accelerator (pedal) opening APO (a driving state of the vehicle) as an arrival through ratio DRatio. This arrival through speed ratio DRatio is a target value at which through speed ratio Ratio is to finally arrive in the above-described driving state. Then, transmission controller 12 sets a target through speed ratio tRatio which is a transient target value to follow through speed ratio Ratio to arrival through speed ratio DRatio with a desired response characteristic and controls variator 20 and sub transmission mechanism 30 so that through speed ratio Ratio becomes coincident with target through speed ratio tRatio.

On the gearshift map, a mode switch up-shift line MU/L at which an up-shift of sub transmission mechanism 30 is carried out (an 1→2 up-shift line of sub transmission 30) is so set as to substantially overlap on low speed mode highest line LH/L. Through speed ratio Ratio corresponding to mode switch up-shift line MU/L is approximately equal to low speed mode highest speed ratio LH/L.

In addition, on the gearshift map, a mode switch down-shift line MD/L at which a down-shift of sub transmission mechanism 30 is carried out (a 2→1 down-shift line of sub transmission mechanism 30) is so set as to substantially overlap on high speed mode lowest line HL/L. Through speed ratio Ratio corresponding to mode switch down-shift line MD/L is approximately equal to high speed mode lowest speed ratio HL/L.

Then, in a case where the operating point of transmission 4 crosses mode switch up-shift line MU/L or mode switch down-shift line MD/L, namely, in a case where target through speed ratio tRatio of transmission 4 is changed crossing a mode switch speed ratio mRatio or becomes coincident with mode switch speed ratio mRatio, transmission controller 12 carries out a mode switch gearshift control. In this mode switch gearshift control, transmission controller 12 carries out the gearshift of sub transmission mechanism 30 and carries out a "cooperative control" in which two gearshifts are cooperated in such a way that speed ratio vRatio of variator 20 is changed in a direction opposite to a direction in which speed ratio subRatio of sub transmission mechanism 30 is changed.

In the cooperative control described above, in a case where target through speed ratio tRatio of transmission 4 crosses mode switch up-shift line MU/L directing from B area side toward C area side, or in a case where target through speed ratio tRatio of transmission 4 becomes coincident with mode switch up-shift line MU/L from B area side, transmission controller 12 outputs an 1→2 up-shift determination, changes the gear position of sub transmission mechanism 30 from a 1-st (first) speed to a 2nd (second) speed, and changes speed ratio vRatio of variator 20 from the highest speed ratio to a low speed ratio. On the contrary, when target through speed ratio tRatio of transmission 4 crosses mode switch down-shift line MD/L directing from the B area side toward the A area side or in a case where target through speed ratio tRatio of transmission 4 becomes coincident with mode switch down-shift line MD/L from the B area side, transmission controller 12 outputs a 2→1 down-shift determination, changes the gear position of sub transmission mechanism 30 from the second speed to the first speed, and changes speed ratio vRatio of variator 20 from the lowest speed ratio to a high speed ratio side.

During the mode switch up-shift or during the mode switch down-shift, reasons for carrying out the cooperative control in which speed ratio vRatio of variator 20 is changed are that a sense of discomfort of a driver due to a change in the input revolution number generated due to a gear position difference of through speed ratio Ratio of transmission 4 can be suppressed and a shift shock of sub transmission mechanism 30 can be relieved.

[A Structure of a Coast Stop Control]

Engine controller 14 in embodiment 1 carries out a coast stop control in which engine 1 is stopped while the vehicle is traveling in a low vehicle speed region (a coast running), in addition to an idle stop control in which engine 1 is stopped during a vehicle stop, in order to suppress a fuel consumption quantity as small as possible.

The above-described "coast stop control" is a control for suppressing the fuel consumption quantity by automatically stopping engine 1 while the vehicle is coast running in a low vehicle speed region. It should be noted that the "coast stop control" is common to a "fuel cut control" executed when the accelerator is off, in that fuel supply to engine 1 is stopped. However, the ordinary "fuel cut control" is executed during a relatively high speed traveling and lock-up clutch 9 of torque converter 2 is engaged in order to secure an engine braking. On the contrary, the "coast stop control" is different from the "fuel cut control" in that the coast stop control is executed during the coast running at a relatively low speed immediately before the vehicle stop and lock-up clutch 9 is released to stop revolution of engine 1.

Upon executing the "coast stop control", engine controller 14 judges, for example, conditions (a) through (e) listed below.

(a): a foot is separated from the accelerator pedal (accelerator pedal opening APO=0)
(b): a brake pedal is depressed (a brake sensor not shown is ON)
(c): vehicle speed VSP is equal to or lower than a predetermined low vehicle speed (for example, 15 km/h)
(d): lock-up clutch 9 is released (for example, vehicle speed 13 km/h)
(e): a high speed mode (2nd speed) due to the engagement of high clutch 33 is selected.

It should be noted that these conditions (a) through (e) are, in other words, conditions for judging that a driver has an intention to stop the vehicle.

When all of start conditions (a) through (e) of the coast stop control are established, engine controller 14 stops the fuel supply to engine 1 and starts the execution of the coast stop control in which the revolution of engine 1 is stopped. At the same time, engine controller 14 sets a coast stop controlling flag CS/FLG representing that the coast stop control is being executed to "1" (CS/FLG=1) and outputs this flag to integrated controller 13 and transmission controller 12. It should be noted that when, during the coast stop control, an accelerator pedal depression operation or a brake release operation is carried out, the condition of (a) or (b) becomes un-established, with this as an end condition, engine controller 14 ends the coast stop control and resets coast stop controlling flag CS/FLG to "0" (CS/FLG=0).

When this coast stop control is started, mechanical oil pump 10 which generates the hydraulic pressure according to the driving force of engine 1 progressively stops due to a reduction of the engine revolution number so that the drain pressure from mechanical oil pump 10 is not supplied to hydraulic pressure control circuit 11. On the other hand, even during the stop of engine 1, the hydraulic pressure is, originally, needed for a grasping force of the belt by means of the respective pulleys of variator 20 and engagements of the frictional engagement elements of sub transmission mechanism 30. Because of this, for example, as described in a Japanese Patent First Application Publication (tokkai) No. 2013-204722, an electrically driven oil pump for compensating for the hydraulic pressure during the engine stop other than the engine driven mechanical oil pump is mounted as the oil pump. On the other hand, in embodiment 1, the electrically driven oil pump is abolished due to a main reason of a system cost reduction and a system in which only mechanical oil pump 10 is mounted is structured. Hence, it becomes necessary to carry out a coast stop corresponding transmission control in an engine low revolution region through an engine stop region in which the hydraulic pressure is not secured.

Therefore, on a basis of input information such as coast stop controlling flag CS/FLG and engine revolution number Ne, transmission controller 12 side carries out the coast stop corresponding transmission control.

Since, as described above, the start conditions of the coast stop control include the high speed mode selection condition (e), high clutch 33 which has been engaged is released when the coast stop control is started. On the other hand, when the coast stop control in a state in which the vehicle is stopped is ended, the vehicle is started at the lowest speed ratio in the low speed mode. Thus, low brake 32 is engaged as a starting clutch. It should be noted that, since the start conditions of the coast stop control include the high speed mode selection condition (e), low brake 32 is engaged during the traveling of the vehicle and, at this time, the coast stop control is not started. When the vehicle is stopped in such a state described above, the idle stop control is carried out. In a case of the idle stop control, the control is started with the vehicle stop as a condition. Hence, after the vehicle stop, low brake 32 is released which is engaged according to the selection of the low speed mode. Then, when the idle stop control is ended, in the same way as the end of the coast stop control, the vehicle is started according to the lowest speed ratio in the low speed mode. Hence, low brake 32 is engaged as the starting clutch.

Figure 4:
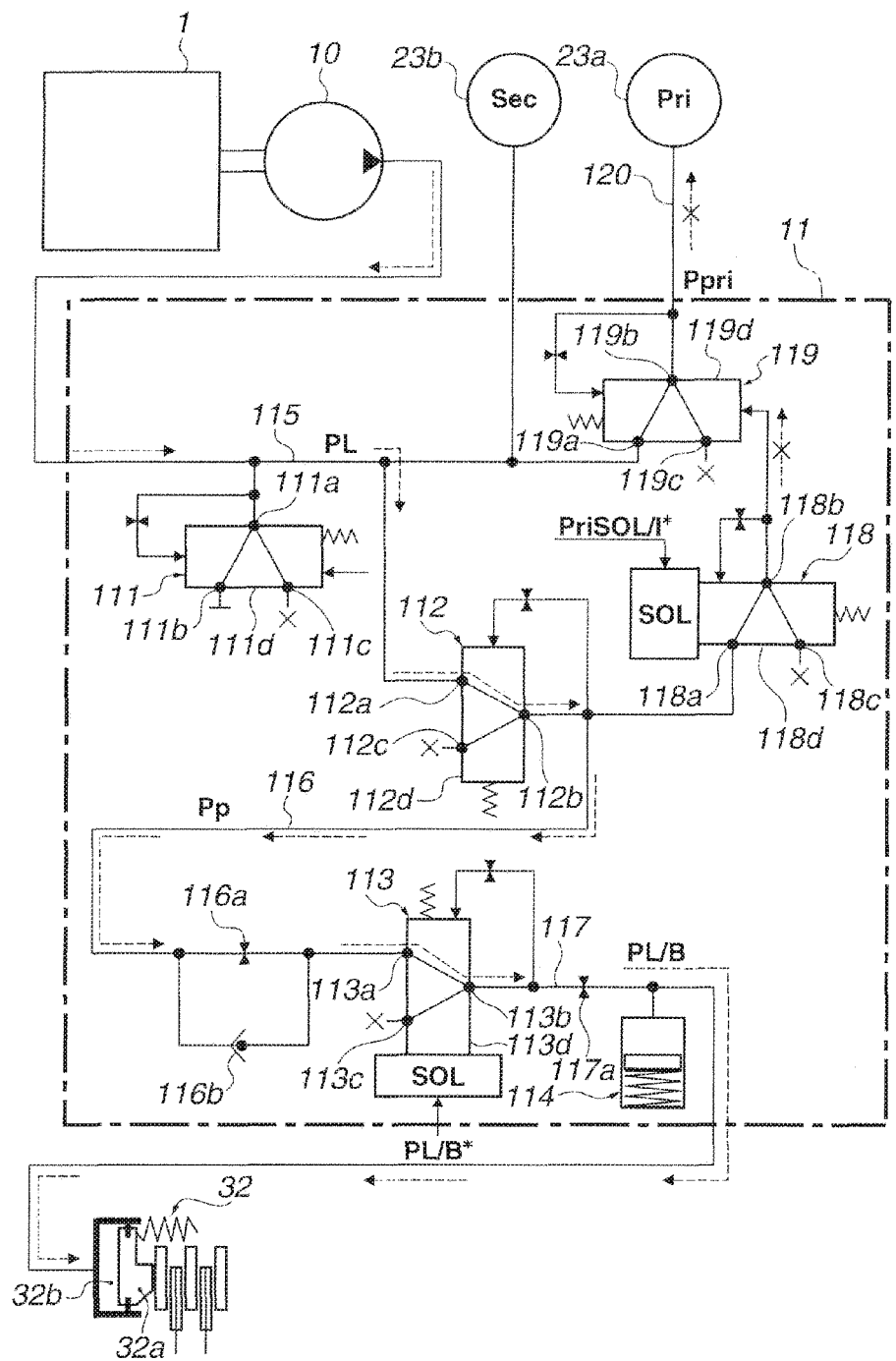
FIG. 4 is a view representing structures of a primary hydraulic pressure chamber, a secondary hydraulic pressure chamber, and a hydraulic pressure circuit to a low brake, from among hydraulic pressure control circuits.

Next, the structure of the hydraulic pressure circuit to primary hydraulic pressure chamber 23a and secondary hydraulic pressure chamber 23b and the structure of the hydraulic pressure circuit to low brake 32 which is engaged as the starting clutch after the end of the engine stop control (coast stop control/idle stop control) will be explained on a basis of FIG. 4.

Low brake 32 is composed of a multiple plate frictional engagement element and has a piston oil chamber 32b defined by a brake piston 32a. Then, gearshift hydraulic pressures for primary hydraulic pressure chamber 23a of primary pulley 21 and for secondary hydraulic pressure chamber 23b of secondary pulley 22 and a clutch hydraulic pressure to low brake 32 are produced by hydraulic pressure control circuit 11 on a basis of a drain pressure from mechanical oil pump 10 driven by engine 1. This hydraulic pressure control circuit 11 includes: a pressure regulator valve 111; a pilot valve 112; a low brake solenoid valve 113; an accumulator 114; a primary solenoid valve 118; and a primary control valve 119.

Pressure regulator valve 111 is a valve which pressure regulates line pressure PL from a pump drain pressure and includes: a line pressure port 111a; a closure port 111b; and a drain port 111c. An operation signal pressure created by means of a spring force and a line pressure solenoid (not shown) is acted upon one end side of valve spool 111d and a feedback pressure is acted upon the other end of valve spool 111d. A line pressure oil passage 115 is connected to line pressure port 111a. Line pressure oil passage 115 is connected to secondary hydraulic pressure chamber 23b without via a valve. In addition, line pressure oil passage 115 is connected to a line pressure port 112a of a pilot valve 112 and to a line pressure port 119a of primary control valve 119.

Pilot valve 112 is a valve which creates a pilot pressure Pp in which a hydraulic pressure upper limit of line pressure PL is regulated and includes: a line pressure port 112a; a pilot pressure port 112b; and a drain port 112c. A spring force is acted upon one end side of valve spool 111d and the feedback pressure is acted upon the other end side of valve spool 111d. A pilot pressure oil passage 116 is connected to pilot pressure port 112b. It should be noted that an orifice 116a and a one-way valve 116b are disposed in pilot pressure oil passage 116 and are connected in parallel to each other.

Low brake solenoid valve 113 is a valve which performs a pressure regulation for low brake hydraulic pressure PL/B with pilot pressure Pp as the source pressure and includes: a pilot pressure port 113a; a low brake pressure port 113b; and a drain port 113c.

The spring force and feedback pressure are acted upon one end side of valve spool 113d and a solenoid force is acted upon the other end side of valve spool 113d.

When the action of the solenoid force is absent, low brake pressure port 113b and drain port 113c are in a communication state. On the other hand, when the solenoid force is acted in response to a clutch hydraulic pressure command value PL/B* from transmission controller 12, pilot pressure port 113a and low brake pressure port 113b are in the communication state. A low brake oil passage 117 is connected to low brake pressure port 113b. An orifice 117a is installed in low brake pressure oil passage 117.

Accumulator 114 is installed at a midway position of low brake pressure oil passage 117, provides a delay for the hydraulic pressure supply and the hydraulic pressure exhaust to piston oil chamber 32b of low brake 32, and suppresses an abrupt rise of the hydraulic pressure to low brake 32.

Primary solenoid valve 118 is a valve which performs the pressure regulation for an operation signal pressure of primary control valve 119 with pilot pressure Pp as the source pressure and includes: a pilot pressure port 118a; an operation signal pressure port 118b; and a drain port 118c. The spring force is acted upon one end side of valve spool 118d and the solenoid force and the feedback pressure are acted upon the other end side of valve spool 118d. When the action of the solenoid force is absent, pilot pressure port 118a and operation signal pressure port 118b are in the communication state by means of the spring force. On the other hand, when the solenoid force overcoming the spring force is acted in response to primary current command value PriSOL/I* from transmission controller 12, operation signal pressure port 118b and drain port 118c are communicated and pilot pressure port 118a is closed.

Primary control valve 119 is a valve which performs the pressure regulation for primary pressure Ppri to primary hydraulic pressure chamber 23a with line pressure PL as the source pressure and includes: a line pressure port 119a; a primary pressure port 119b; and a drain port 119c. Then, the spring force and the feedback pressure are acted upon one end side of valve spool 119d and the operation signal pressure from primary solenoid valve 118 is acted upon the other end side of valve spool 119d. When the action of the operation signal pressure is absent, the spring force causes primary pressure port 119b and drain port 119c to be communicated with each other and line pressure port 119a is closed. On the other hand, when the action of operation signal pressure is present, line pressure port 119a and primary pressure port 119b are communicated with each other. A primary pressure oil passage 120 is connected to primary pressure port 119b.

[A Structure of a Coast Stop Corresponding Transmission Control]

Figure 5:
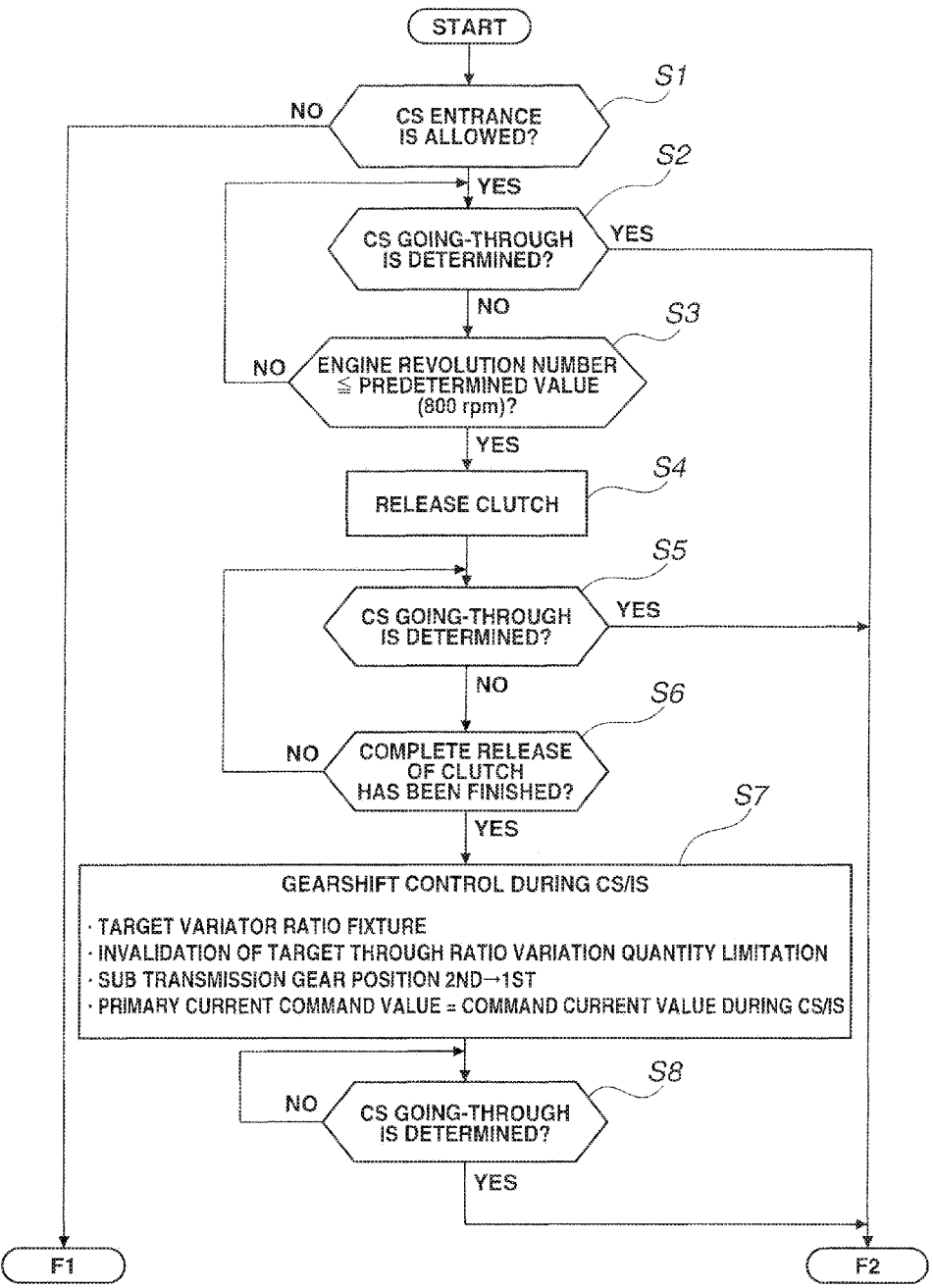
FIG. 5 is a flowchart 1 representing a flow of a coast stop corresponding transmission control processing executed in the transmission controller in embodiment 1.
Figure 6:
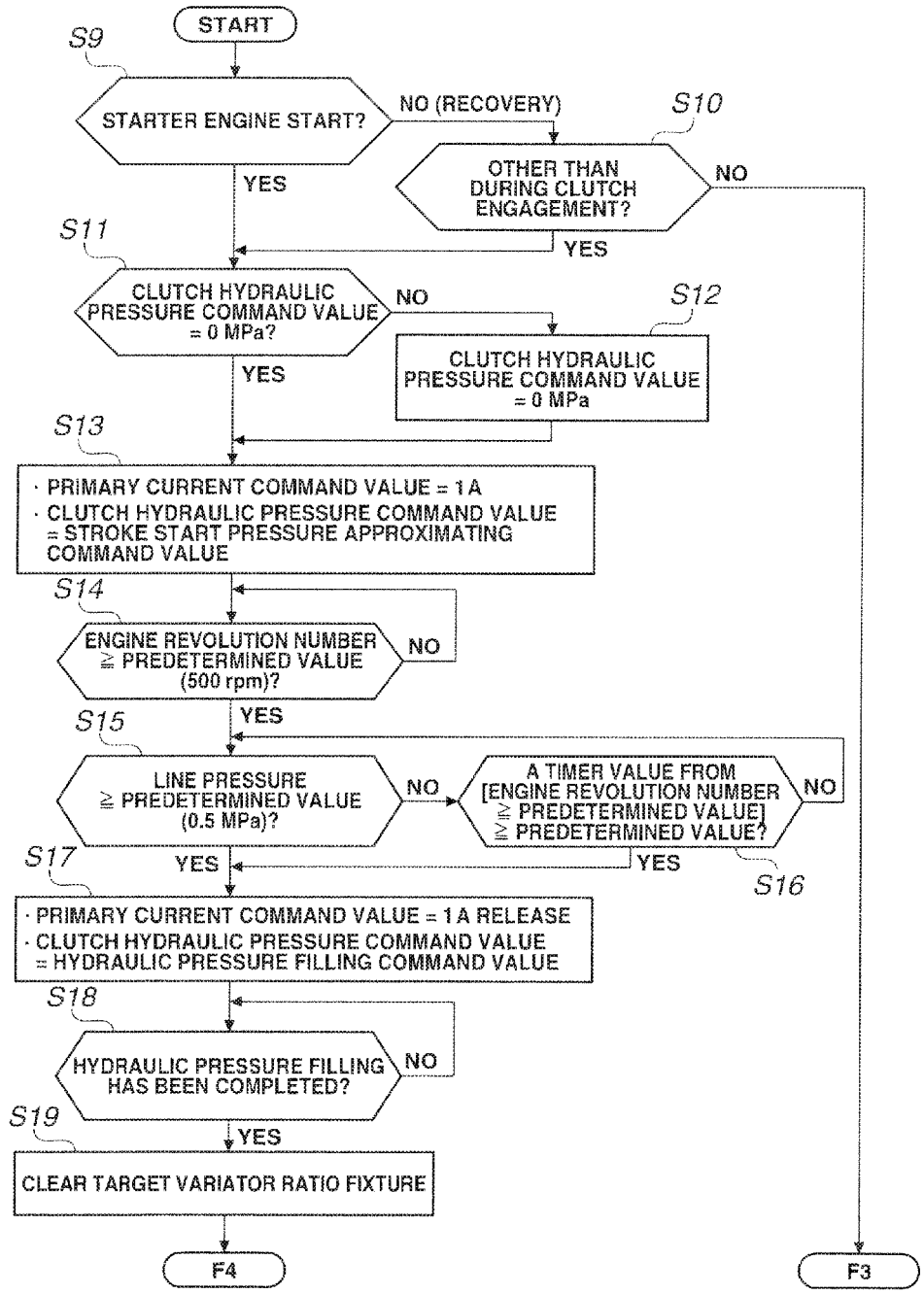
FIG. 6 is a flowchart 2 representing the flow of a coast stop corresponding transmission control processing executed in the transmission controller in embodiment 1.
Figure 7:
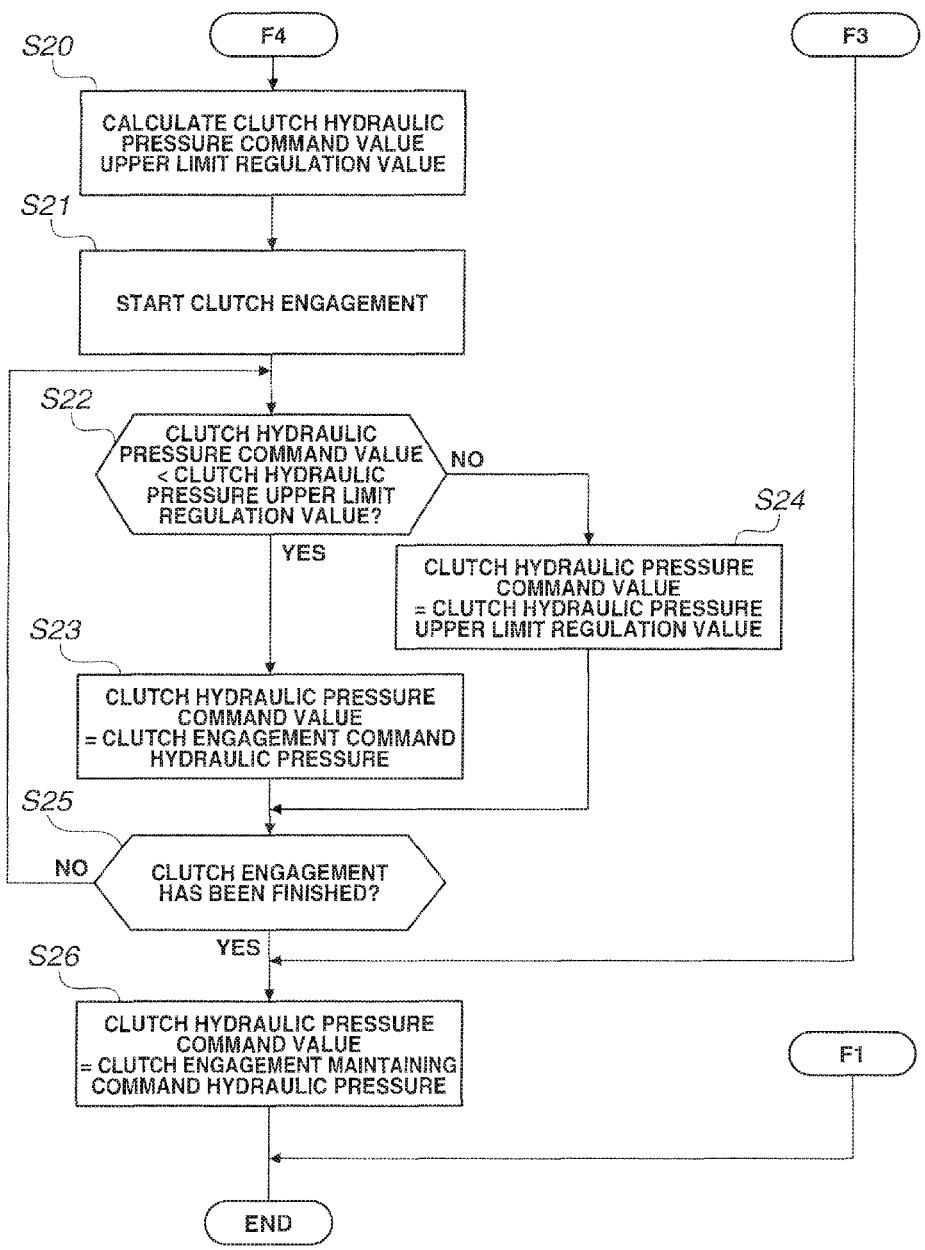
FIG. 7 is a flowchart 3 representing the flow of a coast stop corresponding transmission control processing executed in the transmission controller in embodiment 1.

FIGS. 5 through 7 show a processing flow of the coast stop corresponding transmission control executed in transmission controller 12 of embodiment 1 (transmission control means). Hereinafter, each step of FIGS. 5 through 7 representing the processing structure of the coast stop corresponding transmission control will be explained. It should be noted that the coast stop control is abbreviated as "CS" and the idle stop control is abbreviated as "IS".

At a step S1, transmission controller 12 determines whether an entrance to the coast stop control is allowed. If YES (CS entrance is allowed), the routine goes to a step S2. If NO (CS entrance is not allowed), the routine is ended. It should herein be noted that a determination of the CS entrance is made from the fact that the coast stop controlling flag is switched from flag=0 (CS non-control) to flag=1 (CS controlling).

It should be noted that, at the engine control side, when the coast stop control start conditions are established, the execution of the coast stop control is started in which, after the fuel injection is cut off to reduce the revolution number of engine 1, the engine is in the stopped state.

At step S2, transmission controller 12 determines whether a going-through determination from the coast stop control is present, continuously from the determination that the CS entrance is allowed at step S1 or continuously from the determination at a step S3 that engine revolution number (per unit time)>a predetermined value.

If YES (CS going-through determination is present), the routine goes to a step S9. If NO (CS going-through determination is absent), the routine goes to step S3.

It should, herein, be noted that the determination that the CS going-through determination is present is made when the coast stop control flag is switched from flag=1 (CS controlling) to flag=0 (CS non-control).

It should be noted that, at the engine control side, in a case where the coast stop control end conditions are established, if engine revolution number Ne (per unit time) is equal to or larger than a predetermined revolution number (per unit time) (for example, 1000 rpm), engine 1 is restarted (recovered) through the fuel injection and ignition without use of starter motor 15. In a case where engine revolution number Ne (pre unit time) is lower than the predetermined revolution number (per unit time) (for example, 1000 rpm) so that the restart of engine (recovery) cannot be carried out, after engine revolution number Ne is sufficiently reduced, an engine cranking is carried out using starter motor 15 and a starter start in which the fuel injection is resumed to start engine 1 is carried out.

At step S3, continuously from the determination at step S2 that the CS going-through determination is absent, transmission controller 12 determines whether engine revolution number Ne (per unit time) is equal to or below a predetermined value (for example, 800 rpm). If YES (Ne≤predetermined value), the routine goes to a step S4. If NO (Ne>predetermined value), the routine returns to step S2.

It should be noted that the predetermined value of engine revolution number Ne (per unit time) is set to a revolution number (per unit time) that can be prepared for the re-start through an accelerator pedal depression operation intervention while the generation of a shock is suppressed when high clutch 33 is released. In addition, the predetermined value (for example, 800 rpm) of engine revolution number Ne (per unit time) is a revolution number (800 rpm) (per unit time) at which high clutch 33 is not released in spite of the fact that engine 1 is recovered even when engine revolution number Ne is undershoot and becomes below this revolution number (1000 rpm) after the engine recovery, when engine 1 is recovered at a lowest possible revolution number (for example, 1000 rpm) at which engine 1 is started to recover.

At step S4, continuously from the determination at step S3 that Ne≤predetermined value, transmission controller 12 starts the release of high clutch 33 which has been engaged and the routine goes to a step S5.

At step S5, continuously from the release of the high clutch at step S4 or continuously from the determination at a step S6 that a complete release of the high clutch is un-finished, transmission controller 12 determines whether the going-through determination from the coast stop control is present in the same way as step S2. If YES (CS going-through determination is present), the routine goes to step S9. If NO (CS going-through determination is absent), the routine goes to step S6.

At step S6, continuously from the determination at step S5 that CS going-through determination is absent, transmission controller 12 determines whether a complete release of high clutch 33 has been finished. If YES (high clutch complete release finish), the routine goes to a step S7. If NO (high clutch complete release un-finish), the routine returns to step S5.

At step S7, continuously from the determination at step S6 that the complete release of the high clutch has been finished, transmission controller 12 executes the gearshift control during CS/IS and the routine goes to a step S8. It should, herein, be noted that, in the gearshift control during CS/IS, controls are carried out such that (a) a fixation of a target variator ratio, (b) an invalidation of a target through ratio variation quantity limitation, (c) 2nd speed→1st speed of sub transmission gear position, and (d) a primary current command value=a command current value during CS/IS.

At step S8, continuously from the gearshift control during CS/IS at step S7 or continuously from the determination at step S8 itself that CS going-through determination is absent, transmission controller 12 determines whether the going-through determination from the coast stop control is present, in the same way as step S2 or step S5. If YES (CS going-through determination is present), the routine goes to step S9. If NO (CS going-through determination is absent), the determination at step S8 is repeated.

At step S9, continuously from the determination at step S2, step S5, or step S8 that CS going-through determination is present, transmission controller 12 determines whether the engine start is caused by the starter motor. If YES (starter engine start), the routine goes to a step S11. If NO (recovery), the routine goes to a step S10.

It should, herein, be noted that whether the starter engine start or the recovery is determined by the engine revolution number (per unit time) at a determination timing at which the CS going-through determination is present. For example, in a case where engine revolution number Ne which is equal to or above the predetermined revolution number (1000 rpm) is maintained when the CS going-through determination is present, the recovery can be carried out through the fuel injection and the ignition. When engine revolution number Ne (per unit time) is lowered to a value below the predetermined revolution number (per unit time) (1000 rpm), the starter start using starter motor 15 is carried out.

At step S10, continuously from the determination at step S9 that the recovery is carried out, transmission controller 12 determines whether high clutch 33 is other than during the engagement. If YES (other than during the clutch engagement), the routine goes to a step S11. If NO (during the engagement of the clutch), the routine goes to a step S26. It should, herein, be noted that other than during the clutch engagement refers to a state of high clutch 33 is in the complete engagement state (a state in which high clutch 33 is not slipped).

At step S11, continuously from the determination at step S9 that the starter engine start is carried out or continuously from the determination at step S10 that the state is other than during the clutch engagement, transmission controller 12 determines whether the clutch hydraulic pressure command value to released high clutch 33 is such that clutch hydraulic pressure command value=0 MPa. If YES (clutch hydraulic pressure command value=0 MPa), the routine goes to a step S13. If NO (clutch hydraulic pressure command value≠0 MPa), the routine goes to a step S12.

At step S12, continuously from the determination at step S11 that the clutch hydraulic pressure command value≠0 MPa, transmission controller 12 switches clutch hydraulic pressure command value PH/C* to released high clutch 33 to clutch hydraulic pressure command value=0 MPa. Then, the routine goes to a step S13.

At step S13, continuously from the determination at step S11 that clutch hydraulic pressure command value=0 MPa or continuously from the switching at step S12 that clutch hydraulic pressure command value=0 MPa, transmission controller 12 sets primary current command value PriSOL/I* to 1 A (1 ampere) and changes clutch hydraulic pressure command value PL/B* from 0 MPa to a command value approximately to a stroke start pressure. Then, the routine goes to a step S14.

It should, herein, be noted that primary current command value PriSOL/I* which is 1 A is a current command value which can close the hydraulic pressure circuit to primary hydraulic pressure chamber 23a against a spring biasing force of the primary solenoid in a state in which a base pressure supplied to the primary solenoid is absent.

At step S14, continuously from the setting of primary current command value PriSOL/I* at step S13 and the change of clutch hydraulic pressure command value PL/B* at step S13, transmission controller 12 determines whether engine revolution number Ne (per unit time) is equal to or above a predetermined value (for example, 500 rpm). If YES (Ne≥500 rpm), the routine goes to a step S15. If NO (Ne<500 rpm), the determination at step S14 is repeated.

It should, herein, be noted that the predetermined value of engine revolution number Ne is set to the revolution number at which the engine driven mechanical oil pump 10 can generate line pressure PL by which the hydraulic pressure control to engage low brake 32 is possible.

At step S15, continuously from the determination at step S14 that Ne≥500 rpm or continuously from the determination at a step S16 that a timer value<a predetermined value, transmission controller 12 determines whether an actual line pressure PL detected by line pressure sensor 44 is equal to or above a predetermined value (for example, 0.5 MPa). If YES (PL≥a predetermined value), the routine goes to a step S17. If NO (PL<predetermined value), the routine goes to step S16.

At step S16, continuously from the determination at step S15 that PL<predetermined value, transmission controller 12 determines whether the timer value activated from a time point at which the determination that Ne≥500 rpm is made and added (incremented) as time proceeds is equal to or above the predetermined value. If YES (timer value predetermined value), the routine goes to a step S17. If NO (timer value<predetermined value), the routine returns to step S15.

At step S17, continuously from the determination at step S15 that PL≥predetermined value or continuously from the determination at step S16 that timer value≥predetermined value, transmission controller 12 releases 1 A (1 Ampere) which has been outputted as primary current command value PriSOL/I* and changes clutch hydraulic pressure PL/B* from the command value approximating the stroke start pressure to a command value filling the hydraulic pressure. Then, the routine goes to a step S18. Due to the release of 1 A (1 Ampere) of this primary current command value PriSOL/I*, the hydraulic pressure based on the target hydraulic pressure is supplied to primary hydraulic pressure cylinder 23a of primary pulley 21.

At step S18, continuously from the release of primary current command value PriSOL/I* at step S17 and the change of clutch hydraulic pressure command value PL/B* at step S17, transmission controller 12 determines whether the hydraulic pressure filling to low brake 32 engaged during the re-start has been completed. If YES (the hydraulic pressure filling is completed), the routine goes to a step S19. If NO (the hydraulic pressure filling is not completed), the determination at step S18 is repeated.

At step S19, continuously from the determination at step S18 that the filling of the hydraulic pressure has been completed, transmission controller 12 clears the ratio fixture of the target variation ratio fixed at step S7 and the routine goes to a step S20.

At step S20, continuously from the clearing of the target variation ratio at step S19, transmission controller 12 calculates a clutch hydraulic pressure command value upper limit regulation value PL/B*max to low brake 32 on a basis of an actual line pressure PL detected by line pressure sensor 44 and the routine goes to a step S21. It should, herein, be noted that clutch hydraulic pressure command value upper limit regulation value PL/B*max is calculated in such a way that a belt capacity of variator 20 is calculated on a basis of actual line pressure PL and a predetermined margin α is subtracted from this belt capacity calculation value T(PL), viz., from an equation of PL/B*max=T(PL)−α.

At step S21, continuously from the calculation of clutch hydraulic pressure command value upper limit regulation value PL/B*max at step S20, transmission controller 12 starts the engagement of low brake 32 which is the starting clutch through a clutch engagement command hydraulic pressure as will be described later. Then, the routine goes to a step S22.

At step S22, continuously from the start of the clutch engagement at step S21 or continuously from the determination at a step S25 that the clutch engagement is unfinished, transmission controller 12 determines whether clutch hydraulic pressure command value PL/B* to low brake 32 which is the starting clutch is below clutch hydraulic pressure command value upper limit regulation value PL/B*max. If YES (clutch hydraulic pressure command value<clutch hydraulic pressure command value upper limit regulation value), the routine goes to a step S23. If NO (clutch hydraulic pressure command value≥clutch hydraulic pressure command value upper limit regulation value), the routine goes to a step S24.

At step S23, continuously from the determination at step S22 that clutch hydraulic pressure command value<clutch hydraulic pressure command value upper limit regulation value, transmission controller 12 sets clutch hydraulic pressure command value PL/B* to a clutch engagement command hydraulic pressure. Then, the routine goes to a step S25.

It should, herein, be noted that the clutch engagement command hydraulic pressure is derived from the following equation: clutch engagement command hydraulic pressure=$\tau Ne^2 \times t \times$gear ratio+(a torque required to reduce the revolution).

It should be noted that "$\tau$" denotes a torque capacity coefficient, "t" denotes a torque ratio, "$\tau Ne^2 \times t$" denotes a turbine torque. The "gear ratio" corresponds to a reduction gear ratio and "a torque required to reduce the revolution" corresponds to an inertia torque of variator 20.

At step S24, continuously from the determination at step S22 that clutch hydraulic pressure command value≥clutch hydraulic pressure upper limit regulation value, transmission controller 12 sets clutch hydraulic pressure command value PL/B* to clutch hydraulic pressure command value upper limit regulation value PL/B*max and the routine goes to a step S25.

At step S25, continuously from the setting at step S23 or step S24 of clutch hydraulic pressure command value PL/B*, transmission controller 12 determines whether the engagement of low brake 32 which is the starting clutch has been completed. If YES (clutch engagement finish), the routine goes to a step S26. If NO (clutch engagement un-finish), the routine returns to step S22.

At step S26, continuously from the determination at step S25 that the clutch engagement has been completed or continuously from the determination at step S10 that the clutch is being engaged, transmission controller 12 sets clutch hydraulic pressure command value PL/B* to a clutch engagement maintaining command hydraulic pressure and the routine is ended.

Next, an action will be explained.

The action in the control apparatus for the continuously variable transmission with the sub transmission in embodiment 1 will be explained, dividing the explanation into "a whole action of the coast stop corresponding transmission control", "a hydraulic pressure control action when going through the coast stop control", and "a starting control action from the coast stop control".

[A Whole Action of the Coast Stop Corresponding Transmission Control]

Figure 8:
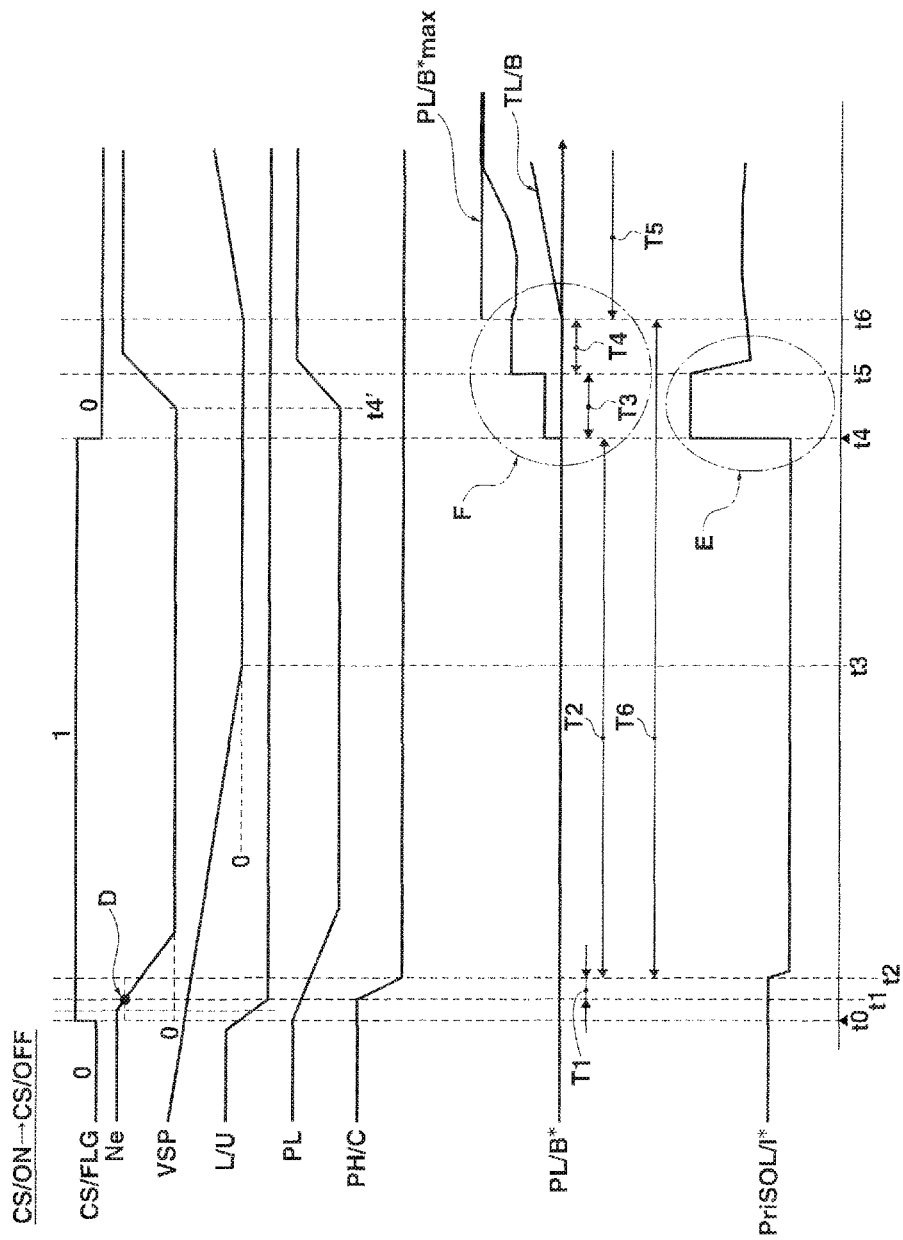
FIG. 8 is a timing chart representing each characteristic of a flag CS/FLG during a coast stop control, engine revolution number Ne, a vehicle speed VSP, a lock-up clutch L/U, a line pressure PL, a high clutch hydraulic pressure PH/C, a clutch hydraulic pressure command value PL/B* to a low brake, and a primary current command value PriSOL/I*.

FIG. 8 shows a timing chart according to the coast stop corresponding transmission control. Hereinafter, the whole action of the coast stop corresponding transmission control will be explained on a basis of FIGS. 5 through 8.

In a case where control is transferred from the coast stop control to the idle stop control and, thereafter, the vehicle is started without CS going-through before the vehicle stop due to the intervention such as the accelerator pedal operation after the coast stop control conditions are established, the following steps are advanced in the flowchart shown in FIGS. 5 through 7.

When the entrance to the coast stop control is allowed and the going-through determination from the coast stop control is absent, in the flowchart of FIG. 5, the routines is advanced as follows: step S1→step S2→step S3. While the engine revolution number (per unit time) Ne is determined to be in excess of the predetermined value, the flow advancing from step S2 to step S3 is repeated. Then, when engine revolution number (per unit time) Ne is determined at step S3 to be equal to or below the predetermined value, the routine goes from step S3 to step S4. At step S4, the release of the engaged high clutch 33 is started. If, while high clutch 33 is released, the going-through determination from the coast stop control is absent, the routine goes from step S4 to step S6 via step S5. While high clutch 33 has finished the complete release, the flow from step S5 to step S6 is repeated.

When, at step S6, the determination that the complete release of high clutch 33 has been finished is made, the routine goes to step S7. At step S7, the gearshift control during CS/IS such that: (a) the fixture of the target variator ratio; (b) the invalidation of the target through ratio variation quantity limitation; (c) sub transmission gear position 2nd speed→1st speed; and (d) primary current command value=CS/IS command current value is executed. This gearshift control during CS/IS is continuously executed until the determination at step S8 that the CS going through determination is present is made.

In a situation in which the vehicle is stopped with the engine stopped, that is to say, in a situation in which the starter start not recovery is carried out, when the CS going-through determination is determined at step S8, the routine is advanced as follows: step S9→step S11→step S13. At step S13, primary current command value PriSOL/I* is set to 1 A (1 Ampere) and clutch hydraulic pressure command value PL/B* is changed from 0 MPa to stroke start pressure approximating command value. At the next step S14, the determination of whether engine revolution number Ne (per unit time) is equal to or above the predetermined value. Then, when engine revolution number Ne (per unit time) is equal to or above the predetermined value due to the starter start, the routine goes from step S14 to step S15→step S17 or the routine goes from step S14 to step S15→step S16→step S17. At step S17, 1 A (1 Ampere) which has been outputted as primary current command value PriSOL/I* is released and clutch hydraulic pressure command value PL/B* is changed from the stroke start pressure approximating command value to the hydraulic pressure filling command value. At the next step S18, the determination of whether the hydraulic pressure filling to low brake 32 which is engaged when the re-start is carried out has been completed is made. When the hydraulic pressure filling to low brake 32 has been completed at step S18, the routine goes to step S19. At step S19, the fixture of the target variator ratio carried out at step S7 is cleared.

When the hydraulic pressure filling to low brake 32 is completed and the fixture of the target variator ratio is cleared, the routine goes to step S20. At step S20, clutch hydraulic pressure command value upper limit regulation value PL/B*max to low brake 32 is calculated on a basis of actual line pressure PL detected by line pressure sensor 44. Then, at the next step S21, the engagement of low brake 32 which is the starting clutch is started. While the clutch hydraulic pressure command value<the clutch hydraulic pressure command value upper limit regulation value after the engagement start of low brake 32, the flow of advancing as follows: step S22→step S23→step S25 is repeated. At step S23, clutch hydraulic pressure command value PL/B* is set to the clutch engagement command hydraulic pressure. On the other hand, when the clutch hydraulic pressure command value≥the clutch hydraulic pressure command value upper limit regulation value after the engagement start of low brake 32, the flow of advancing as follows: step S22→step S24→step S25 is repeated. At step S24, clutch hydraulic pressure command value PL/B* is set to clutch hydraulic pressure command value upper limit regulation value PL/B*max. Then, when, at step S25, the engagement of low brake 32 which is the starting clutch is determined to have been finished, the routine goes from step S25 to step S26. At step S26, clutch hydraulic pressure command value PL/B* provides the clutch engagement maintaining command hydraulic pressure. Then, the routine goes to end and the coast stop corresponding transmission control is ended.

In the timing chart shown in FIG. 8, a time t0 is a CS entrance allowance determination time, a time t1 is a high clutch release start time, a time t2 is a clutch complete release finishing time, a time t3 is a vehicular stop time, a time t4 is a CS going-through determination time, a time t5 is a stroke start pressure command end time, and t6 is a filling hydraulic pressure command end time. Then, a time duration T1 is a clutch release time duration, a time duration T2 is a clutch release maintaining time duration, a time duration T3 is a clutch source pressure rise wait time duration, a time duration T4 is a clutch hydraulic pressure filling time duration, and a time duration T5 is a clutch engagement time duration.

That is to say, when the CS entrance allowance determination is made at time t0, transmission controller 12 monitors a reduction of engine revolution number Ne (per unit time) and starts the release of high clutch 33 from time t1 (an arrow marked point D) at which engine revolution number Ne (per unit time) is equal to or below the predetermined value as shown in a characteristic of a high clutch hydraulic pressure PH/C. Then, at time t2, the complete release of high clutch 33 is finished. In this way, the time duration from time t1 to time t2 is the clutch release time duration T1.

When it becomes clutch complete release finish time t2, clutch release maintaining time duration T2 from a passage of vehicle stop time t3 to the CS going-through determination time t4 is set and the gearshift control during CS/IS is executed.

When the gearshift control during CS/IS is executed, the sub transmission gear position is switched as follows: 2-nd speed→1-st speed. During clutch release maintaining time duration T2, primary current command value PriSOL/I* is set to IS/CS during hydraulic pressure command value (=0 A). In addition, the target variator ratio is fixed and the limitation of the target through ratio variation quantity is invalidated. Thus, the lowest speed ratio is maintained. This lowest speed ratio maintaining time duration T6 is a time duration which is an addition of clutch source pressure rise wait time duration T3 and clutch hydraulic pressure filling time duration T4 to clutch release maintaining time duration T2.

When it becomes the CS going-through determination time t4, the starter start of engine 1 is started. Engine revolution number Ne (per unit time) is started to rise at a time t4' which is a little late than time t4 and line pressure PL is raised on a basis of the drain pressure from engine driven mechanical oil pump 10. Clutch source pressure rise wait time duration T3 from CS going-through determination time t4 to stroke start pressure command end time t5 is set, clutch hydraulic pressure command value PL/B* is the stroke start pressure approximating command value and primary current command value PriSOL/I* is set to a current skip command value (1 A).

When it becomes stroke start pressure command end time t5, engine revolution number Ne (per unit time) is further raised and line pressure PL is also raised up to the target pressure. Then, the time duration from stroke start pressure command end time t5 to filling hydraulic pressure command end time t6 is clutch hydraulic pressure filling time duration T4, clutch hydraulic pressure command value PL/B* is set to the hydraulic pressure filling command value, and primary current command value PriSOL/I* is obliquely reduced from the current skip command value (1 A) to a command value obtaining a target primary pressure.

When it becomes filling hydraulic pressure command end time t6, low brake 32 is actually started to engage, clutch hydraulic pressure upper limit regulation value PL/B*max is calculated from actual line pressure PL, and clutch hydraulic pressure command value PL/B* which does not exceed clutch hydraulic pressure command value upper limit regulation value PL/B*max is outputted.

Thus, the engagement of low brake 32 is advanced after filling hydraulic pressure command end time t6, a transmission torque capacity TL/B of low brake 32 becomes large, and, accordingly, vehicle speed VSP is raised. In other words, from a timing at which it becomes substantially filling hydraulic pressure command end time t6, the re-start of the vehicle is started.

[Hydraulic Pressure Control Action When Going Through the Coast Top Control]

As described above, during a time duration from CS going-through determination time t4 to stroke start pressure command end time t5 (=clutch source pressure rise wait time duration T3), primary current command value PriSOL/I* according to the current skip command value (1 A) is outputted.

On the other hand, clutch hydraulic pressure command value PL/B*, to low brake solenoid valve 113, is set to stroke start pressure approximating command value during a time duration from CS going-through determination time t4 to stroke start pressure command end time t5 (=clutch source pressure rise wait time duration T3). Then, during time duration (=clutch hydraulic pressure filling time duration T4) from stroke start pressure command end time t5 to filling hydraulic pressure command end time t6, clutch hydraulic pressure command value PL/B* is set to the hydraulic pressure filling command value.

First, when going through the coast stop control, engine revolution number Ne (per unit time) in the stopped state is gradually raised due to the re-start of engine 1. A flow quantity of oil from mechanical oil pump 10 driven by engine 1 is by small degrees increased in accordance with a moderate rise of engine revolution number Ne. At this time, pressure regulator valve 111 is to in a state in which an escape passage of pump drained oil is not present and pilot valve 112 is in a state in which a line pressure oil passage 115 is communicated with a pilot pressure oil passage 116.

Hereinafter, the gearshift hydraulic pressure control action to primary hydraulic pressure chamber 23a of primary pulley 21 when going through the coast stop control and the clutch hydraulic pressure control action to low brake 32 when going through the coast stop control will be explained on a basis of FIG. 4.

The gearshift hydraulic pressure control action will be explained. During time duration T3 from the CS going through determination time t4 to stroke start pressure command end time t5, the current skip command value (1 A) is outputted to primary solenoid valve 118 as primary current command value PriSOL/I*. Thus, the solenoid force overcoming the spring force is acted upon valve spool 118d of primary solenoid valve 118 so that operation signal pressure port 118b is communicated with drain port 118c and pilot pressure port 118a is closed. In details, oil from pilot pressure oil passage 116 is blocked from flowing into primary control valve 119 via primary solenoid valve 118. In addition, since the action of the operation signal pressure from primary control valve 119 is not present in valve spool 119d of primary control valve 119, primary pressure port 119b and drain port 119c are communicated by means of the spring force and line pressure port 119a is closed. In details, oil from line pressure oil passage 115 is blocked from flowing into primary hydraulic pressure chamber 23a via primary control valve 119 and oil in primary hydraulic pressure chamber 23a is in a exhaust enabled state.

In this way, when going through the coast stop control, oil from pilot pressure oil passage 116 is blocked from flowing into primary solenoid valve 118 and oil from line pressure oil passage 115 is blocked from flowing into primary control valve 119. Because of this, the oil flow quantity drained from mechanical oil pump 10 due to the re-start of engine 1 is not consumed at primary pulley 21 side. Furthermore, the spring force (not shown) is acted upon the movable conical plate of primary pulley 21. Even if an extra oil is left in secondary hydraulic pressure chamber 23a, this extra oil is speedily drained. Thus, as the speed ratio of variator 20, the lowest speed ratio is stably maintained.

Next, the clutch hydraulic pressure control action will be explained. During time duration T3 from the CS going through determination time t4 to stroke start pressure command end time t5, the stroke start pressure approximating command value is outputted as clutch hydraulic pressure command value PL/B* to low brake solenoid valve 113. Because of this, the solenoid force is acted upon valve spool 113d of low brake solenoid valve 113 so that pilot pressure port 113a and low brake pressure port 113b are in a communication state. Hence, oil drained from mechanical oil pump 10 is caused to flow gradually (by small degrees) through line pressure oil passage 115→pilot pressure oil passage 116→low brake pressure oil passage 117, as denoted by a dot line arrow mark in FIG. 4 and a piping system to low brake 32 is filled up with oil.

At this time, as described above, since oil flow quantity is not consumed at primary pulley 21 side (primary control valve 119 side than primary solenoid valve 118 and primary hydraulic pressure chamber 23a side than primary control valve 119), almost all of oil flow quantity drained from mechanical oil pump 10 can be used in the oil filling at low brake 32 side. Hence, a time required for the piping system to low brake 32 from the CS going through determination until filled up with oil can be shortened.

[Start Control Action from the Coast Stop Control]

As described above, in embodiment 1, when the coast stop control is carried out, primary current command value PriSOL/I* which previously closes the oil passage from mechanical oil pump 10 to primary pulley 21 is outputted to primary solenoid valve 118.

Hence, when engine revolution number Ne (per unit time) is gradually raised due to the re-start of engine 1, an oil passage from mechanical oil pump 10 to primary pulley 21 is previously closed before the rise of engine revolution number Ne and an oil supply to primary hydraulic pressure chamber 23a is stopped.

When the oil supply toward this primary hydraulic pressure chamber 23a is stopped, the oil flow quantity from mechanical oil pump 10 can be used at low brake 32 side and the time required for the engagement of low brake 32 is shortened. In addition, since the oil supply to primary hydraulic pressure chamber 23a is stopped, variator 20 is maintained at lowest speed ratio and the reduction of the driving force during the start of the vehicle is not generated.

Consequently, during the start going through the coast stop control, a reduction of the starting performance can be suppressed. That is to say, an engagement delay of the starting clutch and a reduction of the driving force at the time of the vehicular start which would be concerned when a system from which the electrically driven oil pump is abolished is taken can be prevented.

In embodiment 1, primary current command value PriSOL/I* which previously closes the oil passage from mechanical oil pump 10 to primary pulley 21 is outputted to primary solenoid valve 118 from a coast stop control end time point (time t4) to a line pressure generation time point (time t5).

For example, the output of primary current command value PriSOL/I* which previously closes the oil passage from mechanical oil pump 10 to primary pulley 21 may be continued from a time point at which the coast stop control is started. Because the electrically driven oil pump is abolished, the generation of the hydraulic pressure is absent during the coast stop control and the oil passage to primary pulley 21 can be closed before the rise in the engine revolution number due to the engine re-start. However, in this case, when the vehicular stop time is long, an output continuation time of high primary current command value PriSOL/I* to primary solenoid value 118 becomes accordingly long and an output loss to primary solenoid valve 118 becomes accordingly large.

Whereas, an output time of primary current command value PriSOL/I* to primary solenoid valve 118 is taken as a limited output time from the coast stop control end time point (time t4) to the line pressure generation time point (time t5), as shown in a frame of an arrow mark F in FIG. 8.

Hence, while a current consumption quantity to primary solenoid valve 118 is suppressed to minimum, the reduction of the starting performance can be suppressed. Incidentally, in a case of embodiment 1, as shown within the frame of arrow mark F in FIG. 8, the re-start can be carried out in a time lag (T3+T4) from the CS going through determination time t4 to filling hydraulic pressure command end time t6.

In embodiment 1, primary current command value PriSOL/I* is set to a closed passage current value (1 A) by which the oil passage from mechanical oil pump 10 to the oil passage toward primary pulley 21 overcoming the biasing force of the spring can be closed in spite of a position of valve spool 118d.

For example, even if primary current command value PriSOL/I* which makes the hydraulic pressure zero is outputted at a time point (time t4) at which the coast stop control is ended, the position of valve spool 118d of primary solenoid valve 118 is unknown. Whereas, in primary solenoid valve 118, the biasing force acted by the spring is different depending upon the position of valve spool 118d.

Hence, since primary current command value PriSOL/I* is set to the closed passage current value (1 A), the oil passage from mechanical oil pump 10 to primary pulley 21 can assuredly be closed overcoming the biasing force of the spring and the hydraulic pressure supply to primary pulley 21 can be prevented.

In embodiment 1, when the determination that line pressure generation time point (time t5) has been reached, primary current command value PriSOL/I* is gradually reduced from the closed passage current value (1 A) to a current value in accordance with the target speed ratio.

For example, when primary current command value PriSOL/I* is reduced in a stepwise manner at a time point at which the determination that the line pressure generation time point (time t5) has been reached is made, the pressure regulation operation of primary solenoid valve 118 is abruptly started. Hence, an influence is given on the hydraulic pressure control in which low brake 32 is engaged and which is simultaneously executed.

Whereas, since primary current command value PriSOL/I* is gradually reduced from the closed passage current value (1 A) to the current value in accordance with the target speed ratio, the influence on the hydraulic pressure control in which low brake 32 is engaged and which is simultaneously executed can be suppressed.

In embodiment 1, sub transmission mechanism 30 having a plurality of gear positions is provided in the drive train in which variator 20 is intervened and the starting clutch is low brake 32 which is engaged at the forward 1st speed, from among the frictional engagement elements which change the gearshift stage (gear position). According to the structure, in the vehicle in which the continuously variable transmission with the sub transmission is mounted and the electrically driven oil pump is abolished, after the end of engine stop control (coast stop control/idle stop control), the starting performance without delay in response can be secured.

Next, effects will be explained.

The following effects can be obtained in the control apparatus for the continuously variable transmission with sub transmission in embodiment 1.

(1) In the control apparatus for the continuously variable transmission (the continuously variable transmission with a sub transmission)

equipped with engine 1;

the continuously variable transmission mechanism (variator 20) intervened between engine 1 and driving wheels 7 and configured to transmit a torque by means of belt 23 pressed in grooves of hydraulically driven primary pulley 21 and secondary pulley 22;

the starting clutch (low brake 32) installed in the drive train in which the continuously variable transmission mechanism (variator 20) is intervened;

mechanical oil pump 10 driven by engine 1 and by which the hydraulic pressure is supplied to primary pulley 21, secondary pulley 22, and the starting clutch (low brake 32); and engine stop control means (engine controller 14) for stopping engine 1 when a predetermined start condition is established and for terminating the engine stop control (coast stop control/idle stop control) and re-starting engine 1 when a predetermined end condition is established, primary solenoid valve 118 installed in a midway position of an oil passage from mechanical oil pump 10 to primary pulley 21 and configured to control the hydraulic pressure to primary pulley 21 and transmission control means (transmission controller 12) for outputting primary current command value PriSOL/I* to primary solenoid value 118 are provided and wherein the transmission control means (transmission controller 12) outputs primary current command value PriSOL/I* which previously closes the oil passage from mechanical oil pump 10 to primary pulley 21 (FIG. 6) before engine revolution number Ne is raised due to at least the re-start of engine 1 to primary solenoid valve 118, when the engine stop control (coast stop control/idle stop control) is carried out.

Therefore, during the start of the vehicle which goes through the engine stop control (coast stop control/idle stop control), the reduction of the starting performance can be suppressed.

(2) Transmission control means (transmission controller 12) outputs primary current command value PriSOL/I*, which previously closes the oil passage from mechanical oil pump 10 to primary pulley 21 from the time point (time t4) at which the engine stop control is ended to the time point (time t5) at which the line pressure is generated, to primary solenoid valve 118, when the time point at which line pressure PL equal to or above the predetermined value is generated is said to be the line pressure generation time point (time t5) due to the rise in the revolution number according to the re-start of engine 1 after the engine stop control is ended. Therefore, in addition to the effect of (1), while the current consumption quantity to primary solenoid valve 118 is suppressed to minimum, the reduction of the starting performance can be suppressed.

(3) Transmission control means (transmission controller 12) sets primary current command value PriSOL/I* to a closed circuit current value (1 A) which can close the oil passage from mechanical oil pump 10 to primary pulley 21 overcoming the biasing force of the spring in spite of the position of valve spool 118d. Therefore, in addition to the effect of (1) or (2), the oil passage from mechanical oil pump 10 to primary pulley 21 can assuredly be closed overcoming the biasing force of the spring in spite of the position of valve spool 118d and the supply of hydraulic pressure to primary pulley 21 can be prevented.

(4) The transmission control means (transmission controller 12) gradually reduces primary current command value PriSOL/I* from the closed circuit current value (1 A) to the current value in accordance with the target speed ratio, when determining that the time has reached to line pressure generation time point (time t5).

Therefore, in addition to the effect of (3), an influence on the hydraulic pressure control which is simultaneously executed and in which low brake 32 is engaged can be suppressed.

(5) Sub transmission mechanism 30 having a plurality of gear positions (gearshift stages) is provided in the drive train in which the continuously variable transmission mechanism (variator 20) is intervened and the starting clutch is one of the frictional engagement elements which is engaged at the forward 1st speed from among the frictional engagement elements which change the gearshift stage (gear position) of sub transmission mechanism 30.

Therefore, in addition to the effects of (1) through (4), the vehicle in which the continuously variable transmission with the sub transmission mechanism is mounted with the electrically driven oil pump abolished, the starting performance without a response delay, after the end of the engine stop control (coast stop control/idle stop control) can be assured.

As described hereinabove, the control apparatus for the continuously variable transmission according to the present invention has been explained on a basis of embodiment 1. The specific structure is not limited to this embodiment 1. A modification of design, addition, and so forth are allowed unless departure of a gist of invention related to each claim of a scope of claims.

In embodiment 1, as the starting clutch, low brake 32 provided in sub transmission mechanism 30 is used. However, as the starting clutch, even in a case where the same system is used, high clutch 33 provided in sub transmission mechanism 30 may be used. In addition, in a case of a stepped transmission, an example of the frictional engagement element which is engaged at the forward 1st speed may be used as the starting clutch.

In embodiment 1, as the engine stop control, the example in which both of coast stop control and idle stop control are carried out has been described. However, as the engine stop control, an example in which only the coast stop control is carried out or another example in which only the idle stop control is carried out may be adopted.

In embodiment 1, as the continuously variable transmission, an example in which the continuously variable transmission with the sub transmission is used has been described. However, as the continuously variable transmission, an example in which the continuously variable transmission having no sub transmission is used may be adopted.

In embodiment 1, an example in which the control apparatus according to the present invention is applied to an engine vehicle in which the continuously variable transmission with the sub transmission is mounted is shown. However, the control apparatus for the continuously variable transmission according to the present invention is applicable to a hybrid vehicle. In short, the present invention is applicable to the vehicle having the engine in a drive source.

The invention claimed is:

1. A control apparatus for a continuously variable transmission, comprising:
   an engine;
   a continuously variable transmission mechanism intervened between the engine and driving wheels and configured to transmit a torque by a belt pressed in grooves of a hydraulic pressure driven primary pulley and a secondary pulley;
   a starting clutch installed in a drive train in which the continuously variable transmission mechanism is intervened;

a mechanical oil pump driven by the engine and configured to supply a hydraulic pressure to the primary pulley, the secondary pulley, and the starting clutch;

an engine controller configured to stop the engine when a predetermined start condition is established and to terminate an engine stop control and re-start the engine when a predetermined end condition is established;

a primary solenoid valve installed at an oil passage in a midway position between the mechanical oil pump and the primary pulley and configured to control the hydraulic pressure to be supplied to the primary pulley; and a transmission controller configured to output a primary current command value to the primary solenoid valve, the primary current command value being a command value which previously caused closing of the oil passage from the mechanical oil pump to the primary pulley from an engine stop control end time point to a line pressure generation time point, when a time point, at which a line pressure equal to or above a predetermined value is generated due to a rise in a revolution number according to a re-start of the engine after the engine stop control ends, corresponds to the line pressure generation time point.

2. The control apparatus for the continuously variable transmission as claimed in claim 1, wherein the transmission controller is configured to set the primary current command value to a closed circuit current value at which the oil passage from the mechanical oil pump to the primary pulley closes so as to overcome a biasing force of a spring regardless of a position of a valve spool.

3. The control apparatus for the continuously variable transmission as claimed in claim 2, wherein the transmission controller is configured to gradually reduce the primary current command value from the closed circuit current value to a current value in accordance with a target speed ratio, when a determination is made that a time has reached the line pressure generation time point.

4. The control apparatus for the continuously variable transmission as claimed in claim 1, wherein a sub transmission mechanism having a plurality of gear positions is provided in the drive train in which the continuously variable transmission mechanism is intervened and the starting clutch is a low brake from among frictional engagement elements, and the low brake is engaged during a first forward speed, the low brake changing the gear positions of the sub transmission mechanism.

* * * * *